United States Patent
Gong et al.

(10) Patent No.: US 6,826,510 B2
(45) Date of Patent: Nov. 30, 2004

(54) METHOD, SYSTEM AND COMPUTER PRODUCT FOR PERFORMING GEOMETRIC DIMENSION AND TOLERANCE STACK-UP ANALYSIS

(75) Inventors: Chunhe Gong, Niskayuna, NY (US); Narendra Amalendu Soman, Niskayuna, NY (US); Dean Michael Robinson, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 225 days.

(21) Appl. No.: 10/065,742

(22) Filed: Nov. 14, 2002

(65) Prior Publication Data

US 2004/0098220 A1 May 20, 2004

(51) Int. Cl.⁷ .......................... G06F 15/00; G06F 19/00
(52) U.S. Cl. ....................... 702/155; 700/103
(58) Field of Search .......................... 702/155; 705/26; 703/1; 700/103

(56) References Cited

U.S. PATENT DOCUMENTS

| | | | | |
|---|---|---|---|---|
| 4,918,627 A | * | 4/1990 | Garcia et al. | 702/82 |
| 5,323,333 A | * | 6/1994 | Johnson | 703/1 |
| 5,586,052 A | * | 12/1996 | Iannuzzi et al. | 703/1 |
| 5,771,044 A | * | 6/1998 | Cragun et al. | 345/420 |
| 5,949,693 A | * | 9/1999 | Tandler | 703/1 |
| 5,956,251 A | * | 9/1999 | Atkinson et al. | 700/109 |
| 6,507,806 B1 | * | 1/2003 | Tandler | 703/1 |
| 6,612,044 B2 | * | 9/2003 | Raab et al. | 33/503 |
| 2004/0030427 A1 | * | 2/2004 | Drake et al. | 700/97 |

OTHER PUBLICATIONS

Ngoi et al., Graphical Approach to Assembly Tolerance Stack Analysis– the "Quickie" GDT Method, 1997, Proc. Instn. Mech. Engrs., vol. 211,Part B, pp. 463–472.*
Paul J. Drake, Jr., Dimensioning and Tolerancing Handbook, 1999; pp. 9–1 –9–37.

* cited by examiner

Primary Examiner—John Barlow
Assistant Examiner—Toan M. Le
(74) Attorney, Agent, or Firm—Fletcher Yoder

(57) ABSTRACT

A method for performing geometric dimension and tolerance stack-up analysis for an assembly, the method comprising receiving a target assembly dimension for stack-up analysis, where the assembly includes at least one part. The method further comprises receiving a feature corresponding to the part and receiving feature tolerance data associated with the feature. The feature tolerance data includes at least one of size tolerance and geometric tolerance. Stack-up rules are accessed in response to receiving the feature tolerance data. The stack-up rules include instructions to determine if a form tolerance, an orientation tolerance and a profile tolerance should be included in a stack-up tolerance for the feature. The stack-up rules also include formulas to calculate a nominal dimension and the stack-up tolerance for the feature when the feature tolerance data applies to features of sizes. The nominal dimension and the stack-up tolerance are derived in response to the stack-up rules and the feature tolerance data. Stack-up analysis is performed in response to the nominal dimension and the stack-up tolerance. Performing stack-up analysis results in a mean and standard deviation for the target assembly dimension.

22 Claims, 6 Drawing Sheets

FIG. 2

| GEOMETRIC TOLERANCES APPLIED TO FEATURES | GEOMETRIC TOLERANCES APPLIED TO FEATURES OF SIZES |
|---|---|
| *Form tolerances:* | *Stack-up cross the feature:* |
| Flatness | Straightness (feature of size) |
| Straightness (feature) | Parallelism (feature of size) |
| Circularity | Perpendicularity (feature of size) |
| Cylindricity | Angularity (feature of size) |
|  | Concentricity/symmetry |
| *Orientation tolerances:* | *Stack-up from the datum:* |
| Perpendicularity (feature) | Positioning |
| Angularity (feature) | Circular run-out |
| Parallelism (feature) | Total run-out |
| *Profile Tolerances:* |  |
| Line Profile |  |
| Surface Profile |  |

FIG. 4

|  | GEOM. TOLERANCES APPLIED TO FEATURES | | GEOM. TOLERANCES APPLIED TO FEATURES OF SIZES | |
|---|---|---|---|---|
|  | INTERNAL | EXTERNAL | INTERNAL | EXTERNAL |
| MMC | ME=MMC-GT<br>LE=LMC | ME=MMC+GT<br>LE=LMC | ME=MMC-GT<br>LE=LMC+TT | ME=MMC+GT<br>LE=LMC-TT |
| RFS | ME=MMC-GT<br>LE=LMC | ME=MMC+GT<br>LE=LMC | ME=MMC-GT<br>LE=LMC+GT | ME=MMC+GT<br>LE=LMC-GT |
| LMC | ME=MMC-TT<br>LE=LMC | ME=MMC+TT<br>LE=LMC | ME=MMC-TT<br>LE=LMC+GT | ME=MMC+TT<br>LE=LMC-GT |

FIG. 5

| PART INFO 506 | VECTOR LOOP 508 | DIMENSION & TOLERANCE 510 | | | GDT INFO 512 | | | RESULTANT MEAN & TOL 514 | | | PROCESS INFO 516 | | | OUTPUT 518 |
|---|---|---|---|---|---|---|---|---|---|---|---|---|---|---|
| | | NOMINAL | +TOL | -TOL | NAME | VALUE | CHAR | MEAN | +TOL | -TOL | SIGMA | MEAN | Std. Dev. | % CONTRIBUTION |
| PART 1<br>FEATURE A<br>TOL X<br>TOL Y<br>FEATURE B | | | | | | | | | | | | | | |
| •<br>PART N | | | | | | | | | | | | | | |

LOGISTICAL INFO 502

TARGET DIMENSION NAME NOMINAL TOL(-) TOL(+) 504

RESULT SUMMARY 520

METHOD, SYSTEM AND COMPUTER PRODUCT FOR PERFORMING GEOMETRIC DIMENSION AND TOLERANCE STACK-UP ANALYSIS

BACKGROUND OF INVENTION

The present disclosure relates generally to a method for performing geometric dimension and tolerance stack-up analysis and in particular, to a method of performing geometric dimension and tolerance stack-up analysis for an assembly dimension that takes into account both size and geometric tolerances.

Geometric dimension and tolerance (GDT) stack-up analysis is the process of using known dimensions and tolerances of parts to predict the dimension and tolerance of an assembly dimension between mating or adjoining parts. Geometric dimensioning helps to ensure interchangeability of parts and can allow for more variation in tolerances while still producing a functional part. A dimension is a numerical value used to define the size, shape and location of a feature. The term feature is a general term applied to a physical portion of a part (e.g., a surface, a hole, a slot). Feature of size refers to one cylindrical or spherical surface, or a set of two parallel plane surfaces, each being associated with a toleranced size dimension. Assembly dimensions include items such as clearances, gaps and interferences. Clearances refers to the clearance, or the maximum intended difference between mating parts, that exists between the mating parts under all tolerance conditions. Interference refers to the requirement that the mating parts be pressed or forced together under all tolerance conditions. Gaps are the linear distance between two planes or surfaces.

Tolerances can be classified into two groups: size tolerances and geometric tolerances. Size tolerances control the size of a part and create the inherent looseness of an assembly and must be considered in a stack-up analysis. When only a tolerance of size is specified, the limits of size prescribe the extent to which variations in geometric form, as well as size, are allowed. In other words, a feature cannot extend beyond a boundary of perfect form at maximum material condition (MMC). Geometric tolerances along with size tolerances contribute to the tolerance of shape, angularity, profile and location of an assembly. Typically, geometric tolerances are categorized in terms of five types of tolerances including: form, orientation, profile, location and run-out.

One feature or feature of size may have more than one geometric tolerance and a size tolerance. Different geometric tolerances may interact with each other when they apply to the same feature or feature of size. When many features or features of sizes are involved in an assembly, stack-up analysis can get very complicated.

SUMMARY OF INVENTION

One aspect of the invention is a method for performing geometric dimension and tolerance stack-up analysis for an assembly. The method comprises receiving a target assembly dimension for stack-up analysis, where the assembly includes at least one part. The method further comprises receiving a feature corresponding to the part and receiving feature tolerance data associated with the feature. The feature tolerance data includes at least one of size tolerance and geometric tolerance. Stack-up rules are accessed in response to receiving the feature tolerance data. The stack-up rules include instructions to determine if a form tolerance, an orientation tolerance and a profile tolerance should be included in a stack-up tolerance for the feature. The stack-up rules also include formulas to calculate a nominal dimension and the stack-up tolerance for the feature when the feature tolerance data applies to features of sizes. The nominal dimension and the stack-up tolerance are derived in response to the stack-up rules and the feature tolerance data. Stack-up analysis is performed in response to the nominal dimension and the stack-up tolerance. Performing stack-up analysis results in a mean and standard deviation for the target assembly dimension.

Another aspect of the invention is a system for performing geometric dimension and tolerance stack-up analysis for an assembly. The system comprises a network and a host system in communication with the network. The host system includes software to implement a method. The method comprises receiving a target assembly dimension for stack-up analysis over the network, where the assembly includes at least one part. The method further comprises receiving a feature corresponding to the part over the network and receiving feature tolerance data associated with the feature over the network. The feature tolerance data includes at least one of size tolerance and geometric tolerance. Stack-up rules are accessed in response to receiving the feature tolerance data. The stack-up rules include instructions to determine if a form tolerance, an orientation tolerance and a profile tolerance should be included in a stack-up tolerance for the feature. The stack-up rules also include formulas to calculate a nominal dimension and the stack-up tolerance for the feature when the feature tolerance data applies to features of sizes. The nominal dimension and the stack-up tolerance are derived in response to the stack-up rules and the feature tolerance data. Stack-up analysis is performed in response to the nominal dimension and the stack-up tolerance. Performing stack-up analysis results in a mean and standard deviation for the target assembly dimension.

A further aspect of the invention is a computer program product for performing geometric dimension and tolerance stack-up analysis for an assembly. The computer program product comprises a storage medium readable by a processing circuit and storing instructions for execution by the processing circuit for performing a method. The method comprises receiving a target assembly dimension for stack-up analysis, where the assembly includes at least one part. The method further comprises receiving a feature corresponding to the part and receiving feature tolerance data associated with the feature. The feature tolerance data includes at least one of size tolerance and geometric tolerance. Stack-up rules are accessed in response to receiving the feature tolerance data. The stack-up rules include instructions to determine if a form tolerance, an orientation tolerance and a profile tolerance should be included in a stack-up tolerance for the feature. The stack-up rules also include formulas to calculate a nominal dimension and the stack-up tolerance for the feature when the feature tolerance data applies to features of sizes. The nominal dimension and the stack-up tolerance are derived in responsive to the stack-up rules and the feature tolerance data. Stack-up analysis is performed in response to the nominal dimension and the stack-up tolerance. Performing stack-up analysis results in a mean and standard deviation for the target assembly dimension.

Further aspects of the invention are disclosed herein. The above discussed and other features and advantages of the invention will be appreciated and understood by those skilled in the art from the following detailed description and drawings.

BRIEF DESCRIPTION OF DRAWINGS

Referring to the exemplary drawings wherein like elements are numbered alike in the several FIGURES:

FIG. 2 is a table of exemplary classifications of geometric tolerances;

FIG. 4 is a table of exemplary formulas for calculating tolerances for geometric tolerances applied to features of sizes;

FIG. 5 is an exemplary report for geometric dimension and tolerance stack-up results for a target assembly dimension.

DETAILED DESCRIPTION

One embodiment of the invention is a GDT stack-up analysis tool for facilitating a designer's task of assembly variation analysis. The method implemented by the tool performs geometric dimension and tolerance stack-up analysis for parts in an assembly that include both geometric tolerances and size tolerances, as well as size tolerances with tolerances (e.g., location tolerances, run-out tolerances and orientation tolerances applied to feature of size). In addition, an embodiment of the present invention includes an input wizard that guides the user step-by-step in inputting the dimensional information and geometric tolerances.

Figure 1:
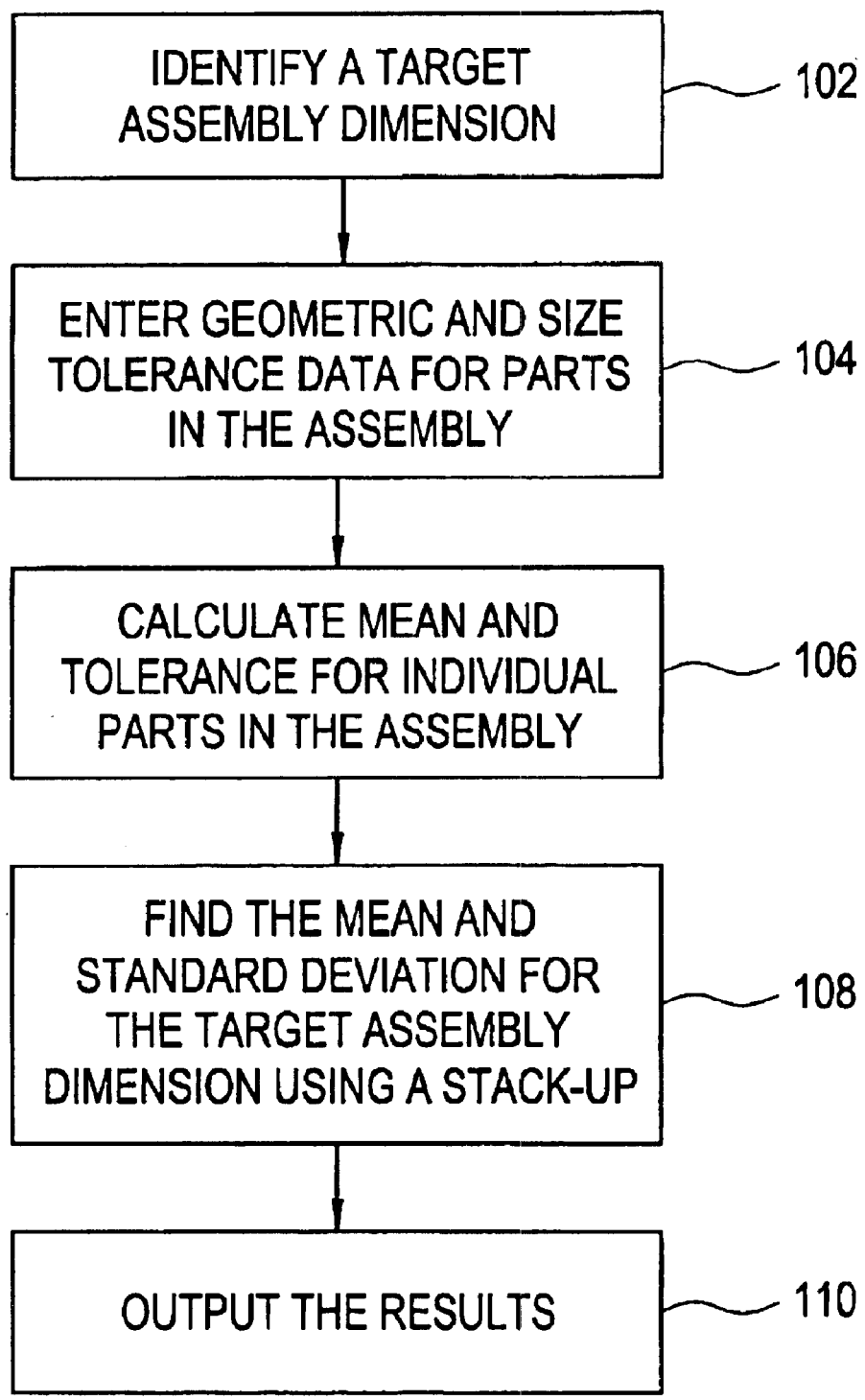
FIG. 1 is a flowchart of an exemplary process for performing geometric dimension and tolerance stack-up analysis for a target assembly dimension.

FIG. 1 is a flowchart of an exemplary process for performing geometric dimension and tolerance stack-up analysis for a target assembly dimension. At step 102, a target assembly dimension to be analyzed is identified. At step 104, the geometric and size tolerance data are input via an input wizard, or screen, for features contained on parts in the target assembly. In an exemplary embodiment of the present invention an input screen prompts the user for part information, geometric tolerances applied to features and geometric tolerances applied to feature of sizes. Part information for a feature can include part name, drawing number, drawing zone, nominal dimension, tolerance(−), tolerance (+), loop coefficient, instance and sigma level. The part name identifies the part that contains the feature; the drawing number identifies the drawing that contains the part; and the drawing zone indicates the location of the part in the drawing. Further, the nominal dimension is the size of the part without tolerances, and tolerance(−) and the tolerance (+) is the required precision, or size tolerance, associated with the nominal dimension. The loop coefficient, also called the sensitivity coefficient, is the value that the gap changes when a particular dimension changes one unit. The instance is how many times a particular dimension appears in the vector loop and the sigma level is how many standard deviations are considered (e.g. 3, 6).

Once the part information is added, geometric tolerances for the feature can be entered through a user input screen. Geometric tolerances for features can include form tolerances (e.g., flatness, straightness, circularity and cylindricity), orientation tolerances (e.g., parallelism, perpendicularity and angularity) and profile tolerances (e.g., line profile and surface profile). For each of these geometric tolerances that are entered, an associated tolerance value, sigma level and part of datum field is also entered. The tolerance value is the allowable variation and the part of datum field identifies the datum that is associated with the tolerance. In an exemplary embodiment of the present invention, geometric tolerances for features of sizes can also be entered into the tool through a user input screen and they include stack-up cross the feature tolerances (e.g., straightness, parallelism, perpendicularity, angularity and concentricity/symmetry) and stack-up from the datum tolerances (e.g., positioning, circular run-out and total run-out). For each of these geometric tolerances that is entered, an associated tolerance value, sigma level, feature and material condition is also entered. The feature field indicates either internal or external features and the material condition indicates either MMC, least material condition (LMC) or regardless of size (RFS).

Referring to FIG. 1, at step 106 the mean, or nominal dimension, and tolerance for features within individual parts, or dimensions, in the assembly are calculated. In an exemplary embodiment of the present invention, the nominal dimension and tolerance for features within individual parts in the assembly are calculated using stack-up rules as described below in reference to FIG. 3. Next, at step 108, the mean and standard deviation for the target assembly dimension are calculated for the assembly stack-up based on the geometric tolerances and nominal dimensions for features within each part in the assembly. By including the geometric tolerances and dimensions for parts within the assembly in the stack-up, the mean and standard deviation for the target assembly dimension can be determined. For each part, or dimension, the resultant nominal dimension and tolerance are calculated based on the development method and formula considering both size and geometric tolerance. The tolerance for the part is calculated by dividing the resultant stack-up tolerance with the sigma level for each nominal dimension associated with a feature. The mean of the target assembly is calculated by adding up the resultant mean for each part multiplied by the corresponding vector loop coefficient and instance number. The standard deviation for the target assembly is equal to the root mean square of the resultant standard deviation for each part dimension.

For example, an assembly may contain five dimensions or parts: A, B, C, D, E with each dimension includes nominal, size and geometric tolerances. For each dimension, the resultant tolerance and nominal dimension are calculated as described below in reference to FIG. 3. The resultant nominal dimensions for A, B, C, D and E are denoted as mA, mB, mC, mD and mE and the resultant tolerances denoted as tolA, tolB, tolC, tolD and tolE. Vector loop coefficients and instances are utilized in order to calculate the target assembly nominal dimension, or mean, and the target assembly tolerance, or standard deviation. For example, five loop coefficients can be denoted as CoA, CoB, CoC, CoD and CoE and could contain values of −1, −1, −1, 1 and 1 respectively. In addition, five loop instances can be denoted as lnA, lnB, lnC, lnD and lnE and could contain values of 1, 1, 1, 1 and 1 respectively. The assembly nominal dimension, or mean, would be calculated as: mA*CoA*lnA+mB*CoB*lnB+mC*CoC*lnC+mD*CoD*lnD+mE*CoE*lnE. The symbol "*" represents the multiplication operation. The assembly tolerance, or standard deviation, would be calculated as: the square root of (average of $(tolA^2+tolB^2+tolC^2+tolD^2+tolE^2)$). This method of calculating the assembly mean and standard deviation is an example and other methods of calculating the stack-up may be implemented with alternate embodiments of the present invention. At step 110 in FIG. 1, the results of the stack-up are output. A sample of how the output could be presented is described in reference to FIG. 5 below.

FIG. 2 is a table of exemplary classifications of geometric tolerances. The table in FIG. 2 includes two types of geometric tolerances: geometric tolerances applied to features 202 and geometric tolerance applied to features of sizes 204. The geometric tolerances are classified based on whether or not they adhere to one of the fundamental rules of geometric tolerancing. The fundamental rule is that for feature of size, where only a size dimension is specified, the surfaces shall not extend beyond a boundary of perfect form at MMC. The geometric tolerances applied to features 202 do not override this fundamental rule. This is in contrast to the geometric tolerance applied to features of sizes 204 tolerances that do override this rule. Geometric tolerances applied to features 202 include form tolerances 206, orientation tolerances 208 and profile tolerances 210. Form tolerances 206 include flatness, straightness (feature), circularity and cylindricty. Orientation tolerances 208 include perpendicularity (feature), angularity (feature) and parallelism (feature). Profile tolerances 210 include line profile and surface profile. Profile tolerances 210, orientation tolerances 208 and form tolerances 206 are a refinement of size tolerance. Orientation tolerances 208 are a refinement of profile tolerances 210; and form tolerances 206 are a refinement of orientation tolerances 208 and profile tolerances 210.

As depicted in FIG. 2, the geometric tolerances applied to features of sizes 204 are grouped into two subgroups: stack-up cross the feature tolerances 212 and stack-up from the datum tolerances 214. Stack-up cross the feature tolerances 212 include straightness (features of size), parallelism (feature of size), perpendicularity (feature of size), angularity (feature of size) and concentricity/symmetry. Stack-up from the datum tolerances 214 include positioning, circular run-out and total runout. The groupings depicted in FIG. 2 are utilized to calculate the nominal dimension and tolerance for features within individual parts in the assembly as described in reference to FIG. 3.

Figure 3:
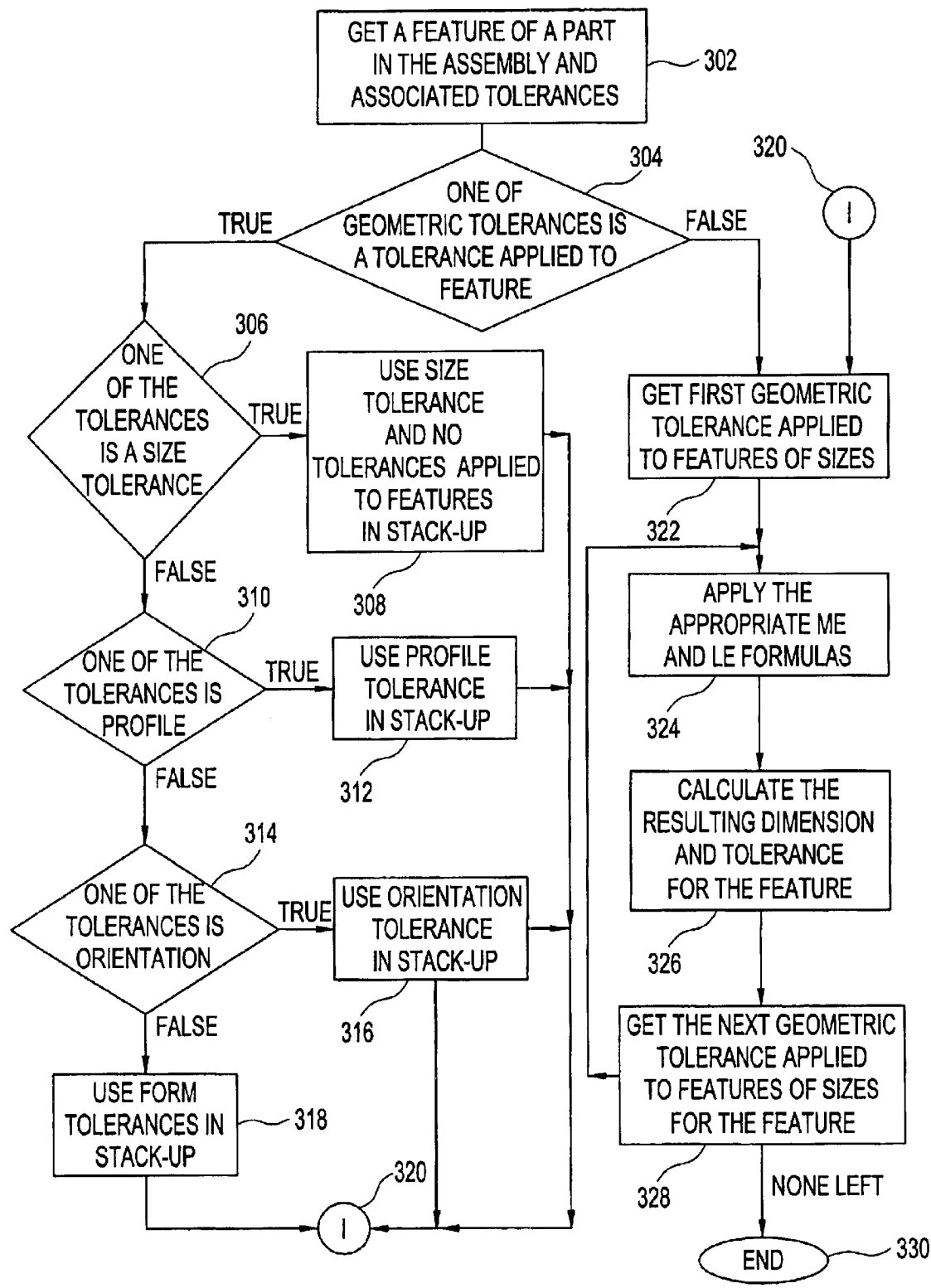
FIG. 3 is a flowchart of an exemplary process for calculating a dimension and tolerance for a feature.

FIG. 3 is a flowchart of an exemplary process for calculating dimensions and tolerances for parts to be included in the assembly stack-up. The process is performed for the features in each part within the assembly. At step 302, a feature of a part within the assembly and the associated geometric and size tolerances are accessed. At step 304, a check is made to determine if one of the geometric tolerances falls under the category of geometric tolerances applied to features 202. If one of the geometric tolerances falls under this category, then step 306 is performed. Otherwise, processing continues with step 322. The rules for the GDT stack-up of the geometric tolerances applied to features 202 include: the geometric tolerances applied to features 202 are not included in the stack-up if the size tolerance is present; form tolerances 206 are included only if size tolerances, orientation tolerances 208, and profile tolerances 210 do not exist; orientation tolerances 208 are included in the stack-up only if profile tolerances 210 and size tolerances do not exist; and profile tolerances 210 are included in the stack-up only if a size tolerance does not exist. An exemplary embodiment of programming logic to implement these rules is depicted in step 306 through 320 in FIG. 3.

At step 306 a check is made to determine if one of the tolerances is a size tolerance. If one of the tolerances is a size tolerance, step 308 is performed and the size tolerances and no geometric tolerances applied to features 202 are included in the stack-up calculation. Otherwise, if size tolerance does not exist, step 310 is performed and a check is made to determine if one of the tolerances is a profile tolerance 210. If one of the tolerances is a profile tolerance 210 then only the profile tolerances 210 and no other geometric tolerances applied to features 202 are included in the stack-up. Otherwise, step 314 is performed to determine if one of the geometric tolerances applied to features 202 is an orientation tolerance 208. If one of the tolerances is an orientation tolerance 208 then only the orientation tolerances 208 and no other geometric tolerances applied to features 202 are included in the stack-up. Otherwise, at step 318 it is assumed that the geometric tolerance applied to features tolerance is a form tolerance 206 and the form tolerances 206 will be applied in the stack-up. After the processing for geometric tolerances applied to features 202 is completed at marker 320, step 322 is performed.

At step 322, the first geometric tolerance applied to features of sizes 204 is accessed. The geometric tolerances applied to features of sizes 204 are included in the assembly stack-up irrespective of whether or not a size tolerance is present. Since the size tolerance and geometric tolerances applied to features of sizes 204 interact with each other they can not be included independently. Instead, at step 324, formulas, such as those depicted in FIG. 4 are utilized to calculate the resultant nominal dimension and tolerance to be included in the GDT stack-up. The specific formulas utilized for a given geometric tolerance applied to features of sizes 204 depends on several factors including: whether the geometric tolerance is a stack-up cross the feature tolerance 212 or a stack-up from the datum tolerance 214; whether the feature is an internal feature or an external feature; and whether the material condition is an MMC, RFS or LMC. Output from the formulas depicted in FIG. 4 include the MMC envelop (the maximum envelop or ME) and the LMC envelop (the least envelop or LE). For an internal feature, such as a hole, the ME is the least size (diameter or radius) of the hole, while the LE is the maximum size (diameter or radius) for the hole. For an external feature, such as a cylinder, ME is the maximum size (diameter or radius) for the cylinder while LE represents the least possible size (diameter or radius) for the cylinder.

At step 326, the resulting dimension and tolerance for the geometric tolerance applied to features of sizes 204 within the part is calculated. In an exemplary embodiment, the resultant nominal dimension, or mean, is calculated by adding the ME and the LE and dividing the result by two (i.e., {ME+LE}/2). The resultant tolerance, or equal bilateral tolerance, is calculated for external features by subtracting the LE from the ME and dividing the result by two (i.e., {ME−LE}/2) The resultant tolerance, or equal bilateral tolerance, for internal features is calculated by subtracting the ME from the LE and dividing the result by two (i.e., {LE−ME}/2). At step 328, the next geometric tolerance applied to feature of sizes 204 for the feature is accessed and processing loops back to step 324. If no more geometric tolerances applied to features of sizes 204 exist for the feature processing ends at step 330. The resultant mean and tolerance for each part dimension is calculated based on the flowchart shown in FIG. 3. For feature of size it is necessary to use the formula shown in FIG. 4 to calculate the resultant mean and tolerance.

FIG. 4 is a table of exemplary formulas for calculating tolerances for geometric tolerances applied to features of sizes 204. The table is broken down into two major sections: formulas for stack-up cross the feature tolerances 402 and formulas for stack-up from the datum tolerances 404. The formulas for stack-up cross the feature tolerances 402 are further broken down into separate columns based on whether the feature is internal or external. Then, depending on whether the material condition is MMC 406, RFS 408 or LMC 410, formulas are selected for calculating the ME and the LE. Similarly, the formulas for stack-up from the datum 404 are also broken down into separate columns and rows based on whether the feature is internal or external, and whether the material condition is MMC 406, RFS 408 or LMC 410. "GT" in FIG. 4 refers, to the geometric tolerance and "TT" is the total tolerance. The total tolerance (TT) is computed by adding the GT and the size tolerance.

FIG. 5 is an exemplary report for geometric dimension and tolerance stack-up results for a target assembly dimension. The report heading can include logistical information 502, such as assembly name, analyst name, date and revision number. The report heading data can also include target dimension 504 data for the target assembly, such as the name, the nominal value and the associated plus and minus tolerances. The body of the report includes columns for part information 506; vector loop 508 (e.g., coefficient and instance); dimension and tolerance 510 (e.g., part information entered by the user); GDT information 512 (e.g., the data entered by the user for each feature); resultant mean and tolerances 514; process information 516 (e.g., sigma, mean, standard deviation); and output 518 (e.g., individual tolerance contribution). The report would include an entry for each part that includes a feature used in the stack-up analysis for the target assembly dimension. In addition, the report depicted in FIG. 5 includes a result summary 520 with data from both an arithmetic stack-up and a statistical stack-up. The result summary 520 displays the maximum and minimum values from statistical and arithmetic methods, defects per million opportunities and the 3/6 sigma limits. The report could also include a vector loop graph that graphically represents the dimensional contributors for each assembly stack-up. Further, the report could include a chart of the results of the statistical stack-up for the target dimension that also indicates the arithmetic minimum and maximum. Other report configurations are possible based on data that is available and individual user requirements.

Figure 6:
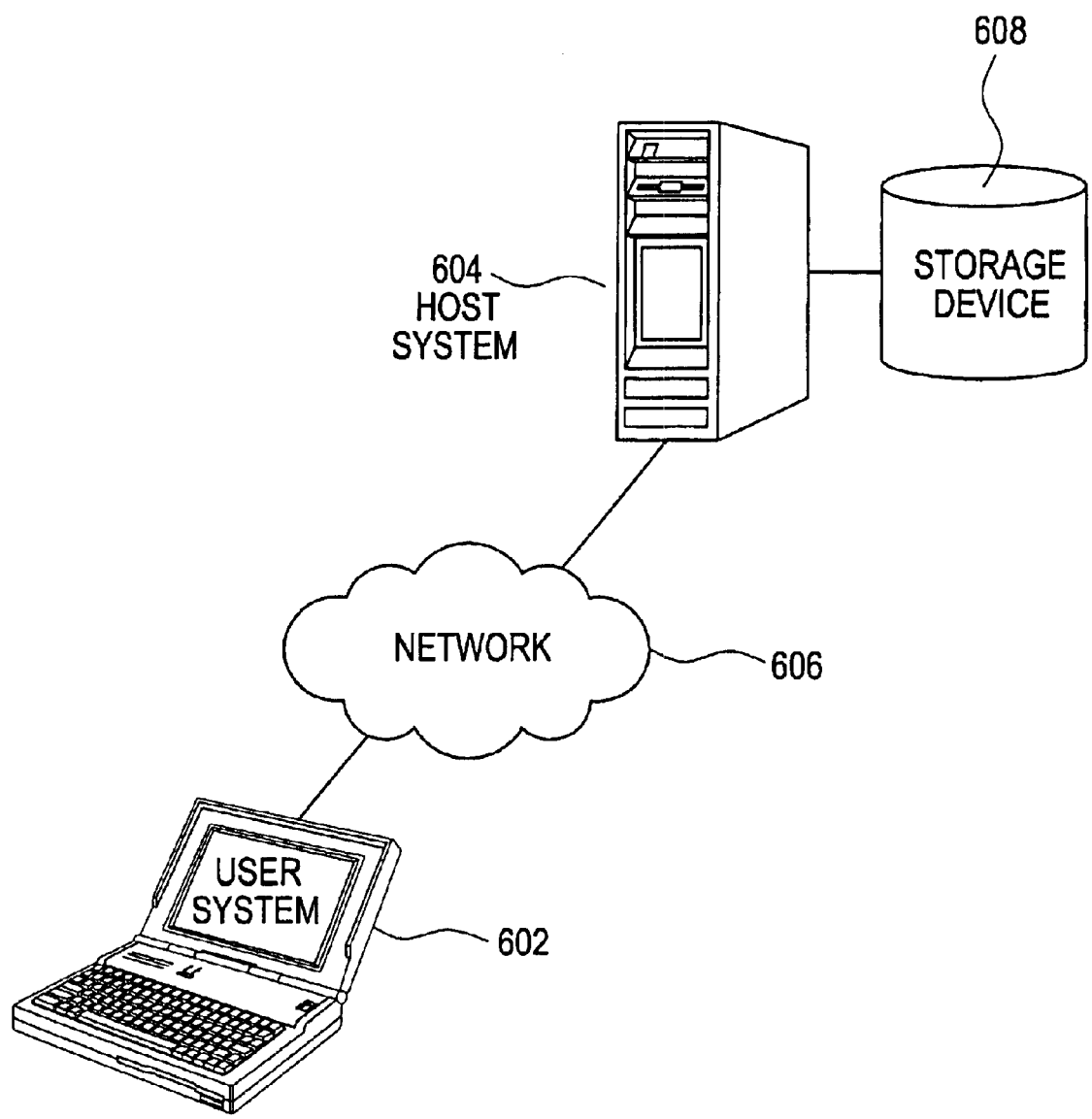
FIG. 6 is a block diagram of an exemplary system for performing geometric dimension and tolerance stack-up analysis.

FIG. 6 is a block diagram of an exemplary system for performing geometric dimension and tolerance stack-up analysis. The system of FIG. 6 includes a user system 602 through which an end-user can access a software tool through user screens to perform geometric dimension and tolerance stack-up analysis. The user system 602 would access the software tool by making a request to an application program located on the host system 604. Geometric dimension and tolerance stack-up data can be stored on a storage device 608 connected to the host system 604. The data can be entered by the user system 602 through input screens tailored to the application. In addition, data can be imported from other systems and entered in a batch or background mode. In an exemplary embodiment, the end-user is an analyst located at a design or manufacturing site. A plurality of end-users could be connected to the host system 604 through the network 606 and each may be located in a different geographic location. The user system 602 can be directly connected to the host system 604 or it could be coupled to the host system 604 via the network 606. The user system 602 may be implemented using a general-purpose computer executing a computer program for carrying out the processes described herein. The user system 602 may be a personal computer or a host attached terminal. If the user system 602 is a personal computer, the processing described herein may be shared by the user system 602 and the host system 604 by providing an applet to the user system 602.

The network 606 may be any type of known network including a local area network (LAN), a wide area network (WAN), an intranet, or a global network (e.g., Internet). The user system 602 and the host system 604 may be connected to the network 606 in a wireless fashion and the network 606 may be a wireless network. In an exemplary embodiment, the user system 602 executes a web browser to contact the host system 604 through the network 606.

The host system 604 may be implemented using a server operating in response to a computer program stored in a storage medium accessible by the server. The host system 604 may operate as a network server (often referred to as a web server) to communicate with the user system 602. The host system 604 handles sending and receiving information to and from the user system 602 and can perform associated tasks. The host system 604 may also include a firewall to prevent unauthorized access to the host system 604 and enforce any limitations on authorized access. The firewall may be implemented using conventional hardware and/or software as is known in the art.

The host system 604 also operates as an application server. The host system 604 executes one or more application programs to provide access to the geometric dimension and tolerance stack-up analysis software tool in order to perform the processing described herein. Processing may be shared by the user system 602 and the host system 604 by providing an application (e.g., java applet) to the user system 602. Alternatively, the user system 602 can include a stand-alone software application for performing a portion of the processing described herein. It is understood that separate servers may be used to implement the network server functions and the application server functions. Alternatively, the network server, firewall and the application server can be implemented by a single server executing computer programs to perform the requisite functions.

The storage device 608 may be implemented using a variety of devices for storing electronic information such as a file transfer protocol (FTP) server. It is understood that the storage device 608 may be implemented using memory contained in the host system 604 or it may be a separate physical device. The storage device 608 contains a variety of information related to GDT stack-up and analysis. The host system 604 may also operate as a database server and coordinate access to application data including data stored on the storage device 608. The GDT stack-up and analysis data can be physically stored as a single database with access restricted based on user characteristics or it can be physically stored in a variety of databases including portions of the database on the user system 602 or the host system 604.

An embodiment of the invention provides for a GDT stack-up analysis tool for facilitating a designer's task of assembly variation analysis. The method implemented by the tool performs geometric dimension and tolerance stack-up analysis for parts in an assembly that include both geometric tolerances and size tolerances, as well as size tolerances with tolerances (e.g., location tolerances, run-out tolerances and orientation tolerances applied to feature of size). The ability to take into account both size and geometric tolerances in the GDT stack-up can result in more accurately predicting overall tolerances for assemblies and parts. Further, the ability to more accurately predict overall tolerances can lead to decreased manufacturing costs due to less rework and scrap, as well as the ability to allow greater tolerances when possible.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for performing geometric dimension and tolerance stack-up analysis for an assembly, the method comprising:

receiving a target assembly dimension for stack-up analysis, wherein said assembly includes at least one part;

receiving a feature corresponding to said part;

receiving feature tolerance data associated with said feature, wherein said feature tolerance data includes at least one of size tolerance and geometric tolerance;

accessing stack-up rules in response to said receiving feature tolerance data, wherein said stack-up rules include:

instructions to determine if a form tolerance, an orientation tolerance and a profile tolerance should be included in a stack-up tolerance for said feature; and formulas to calculate a nominal dimension and said stack-up tolerance for said feature when said feature tolerance data applies to feature of sizes;

deriving said nominal dimension and said stack-up tolerance for said feature responsive to said stack-up rules and to said feature tolerance data; and performing said stack-up analysis in response to said nominal dimension and to said stack-up tolerance, wherein said performing results in a mean and a standard deviation for said target assembly dimension.

2. The method of claim 1 wherein said feature tolerance data includes both said size tolerance and said geometric tolerance.

3. The method of claim 2 wherein said geometric tolerance includes at least one of a geometric tolerance applied to features tolerance and a geometric tolerance applied to features of sizes tolerance.

4. The method of claim 1 wherein said instructions include:

determining if said feature tolerance data includes said size tolerance, said form tolerance, said orientation tolerance and said profile tolerance;

calculating said nominal dimension and said stack-up tolerance utilizing said size tolerance in response to said determining resulting in finding that said size tolerance is included in said feature tolerance data;

calculating said nominal dimension and said stack-up tolerance utilizing said profile tolerance in response to said determining resulting in finding that said size tolerance is not included in said feature tolerance data and that said profile tolerance is included in said feature tolerance data;

calculating said nominal dimension and said stack-up tolerance utilizing said orientation tolerance in response to said determining resulting in finding that said size tolerance and said profile tolerance are not included in said feature tolerance data and that said orientation tolerance is included in said feature tolerance data; and calculating said nominal dimension and said stack-up tolerance utilizing said form tolerance in response to said determining resulting in finding that said size tolerance, said profile tolerance and said orientation tolerance are not included in said feature tolerance data and that said form tolerance is included in said feature tolerance data.

5. The method of claim 4 wherein said formulas include:

updating said nominal dimension and said stack-up tolerance utilizing a geometric tolerance applied to features of sizes tolerance in response to said feature tolerance data including said geometric tolerance applied to features of sizes tolerance.

6. The method of claim 5 wherein said geometric tolerance applied to features of sizes tolerance includes a stack-up cross the feature tolerance.

7. The method of claim 6 wherein said stack-up cross the feature tolerance includes a straightness feature of size tolerance, a parallelism feature of size tolerance, a perpendicularity feature of size tolerance, an angularity feature of size tolerance, or a concentricity/symmetry tolerance.

8. The method of claim 5 wherein said geometric tolerance applied to features of sizes tolerance includes a stack-up from the data tolerance.

9. The method of claim 8 wherein said stack-up from the data tolerance includes a positioning tolerance, a circular run-out tolerance or a total run-out tolerance.

10. The method of claim 5 wherein said utilizing said geometric tolerance applied to features of sizes tolerance includes accessing a table of formulas for deriving said nominal dimension and said stack-up tolerance.

11. The method of claim 10 wherein said table is indexed by a type of material condition, a type of feature and a type of geometric tolerances applied to features of sizes.

12. The method of claim 11 wherein said type of material condition includes maximum material condition, least material condition and regardless of size.

13. The method of claim 11 wherein said type of feature includes an external feature and an internal feature.

14. The method of claim 11 wherein said type of geometric tolerances applied to features of sizes includes a stack-up cross the feature and a stack-up from the datum.

15. The method of claim 1 further comprising outputting said mean and said standard deviation for said target assembly dimension.

16. The method of claim 1 wherein said outputting is in a report format.

17. The method of claim 1 wherein said target assembly dimension, said feature and said feature tolerance data were input using an input wizard tool.

18. A system for performing geometric dimension and tolerance stack-up analysis for an assembly, the system comprising:
- a network; and
- a host system in communication with said network, said host system including software to implement a method comprising:
- receiving a target assembly dimension for stack-up analysis over said network, wherein said assembly includes at least one part;
- receiving a feature corresponding to said part over said network;
- receiving feature tolerance data associated with said feature over said network, wherein said feature tolerance data includes at least one of size tolerance and geometric tolerance;
- accessing stack-up rules in response to said receiving feature tolerance data, wherein said stack-up rules include:
- instructions to determine if a form tolerance, an orientation tolerance and a profile tolerance should be included in a stack-up tolerance for said feature; and
- formulas to calculate a nominal dimension and said stack-up tolerance for said feature when said feature tolerance data applies to features of sizes;
- deriving said nominal dimension and said stack-up tolerance for said feature responsive to said stack-up rules and to said feature tolerance data; and
- performing said stack-up analysis in response to said nominal dimension and to said stack-up tolerance, wherein said performing results in a mean and a standard deviation for said target assembly dimension.

19. The system of claim 18 wherein said network is an intranet.

20. The system of claim 18 wherein said network is the Internet.

21. The system of claim 18 further comprising a user system in communication with said network and wherein said target assembly dimension, said feature corresponding to said part and said feature tolerance data are received from said user system over said network.

22. A computer program product for performing geometric dimension and tolerance stack-up analysis for an assembly, the computer product comprising:
- a storage medium readable by a processing circuit and storing instructions for execution by the processing circuit for performing a method comprising:
- receiving a target assembly dimension for stack-up analysis, wherein said assembly includes at least one part;
- receiving a feature corresponding to said part;
- receiving feature tolerance data associated with said feature, wherein said feature tolerance data includes at least one of size tolerance and geometric tolerance;
- accessing stack-up rules in response to said receiving feature tolerance data, wherein said stack-up rules include:
- instructions to determine if a form tolerance, an orientation tolerance and a profile tolerance should be included in a stack-up tolerance for said feature; and
- formulas to calculate a nominal dimension and said stack-up tolerance for said feature when said feature tolerance data applies to features of sizes;
- deriving said nominal dimension and said stack-up tolerance for said feature responsive to said stack-up rules and to said feature tolerance data; and
- performing said stack-up analysis in response to said nominal dimension and to said stack-up tolerance, wherein said performing results in a mean and a standard deviation for said target assembly dimension.

* * * * *